U.S. Patent Number: 5,842,165
Date of Patent: Nov. 24, 1998

United States Patent
Raman et al.

[54] METHODS AND APPARATUS FOR GENERATING AND USING GARBAGE MODELS FOR SPEAKER DEPENDENT SPEECH RECOGNITION PURPOSES

[75] Inventors: Vijay R. Raman, Greenwich, Conn.; George J. Vysotsky, Riverdale, N.Y.

[73] Assignee: Nynex Science & Technology, Inc., White Plains, N.Y.

[21] Appl. No.: 846,617

[22] Filed: Apr. 30, 1997

Related U.S. Application Data

[63] Continuation-in-part of Ser. No. 609,029, Feb. 29, 1996, Pat. No. 5,719,921.

[51] Int. Cl.⁶ .................................................. G10L 9/06
[52] U.S. Cl. .......................... 704/255; 704/231; 704/256
[58] Field of Search .................................. 704/231, 243, 704/245, 200, 244, 255, 256, 252, 250; 379/88

[56] References Cited

U.S. PATENT DOCUMENTS

| | | | |
|---|---|---|---|
| 4,720,863 | 1/1988 | Li | 381/42 |
| 4,773,093 | 9/1988 | Higgins | 381/42 |
| 4,914,703 | 4/1990 | Gillick | 381/43 |
| 5,054,074 | 10/1991 | Bakis | 381/41 |
| 5,165,095 | 11/1992 | Borcheding | 379/88 |
| 5,167,004 | 11/1992 | Netsch | 395/2 |
| 5,440,662 | 8/1995 | Sukkar | 704/236 |
| 5,524,169 | 6/1996 | Cohen | 395/2.4 |
| 5,598,507 | 1/1997 | Kimber et al. | 704/246 |
| 5,606,643 | 2/1997 | Balasybramanian et al. | 704/243 |
| 5,606,644 | 2/1997 | Chou et al. | 704/244 |
| 5,649,057 | 7/1997 | Lee | 395/2.65 |
| 5,687,287 | 11/1997 | Gandhi | 395/2.56 |
| 5,710,864 | 1/1998 | Juang et al. | 704/238 |
| 5,732,187 | 3/1998 | Scruggs | 395/2.6 |
| 5,737,487 | 4/1998 | Bellegarda | 395/25.9 |

*Primary Examiner*—Richemond Dorvil
*Attorney, Agent, or Firm*—Michaelson & Wallace; Peter L. Michaelson; Michael P. Straub

[57] ABSTRACT

Methods and apparatus for the generation of speaker dependent garbage models from the very same data used to generate speaker dependent speech recognition models, e.g., word models, are described. The technique involves processing the data included in the speaker dependent speech recognition models to create one or more speaker dependent garbage models. The speaker dependent garbage model generation technique involves what may be described as distorting or morphing of a speaker dependent speech recognition model to generate a speaker dependent garbage model therefrom. One or more speaker dependent speech recognition models may then be combined with the generated speaker dependent garbage model to produce an updated garbage model. The scoring of speaker dependent garbage models is varied in accordance with the present invention as a function of the number of speech recognition models from which the speaker dependent garbage model was created. In one embodiment, the number of speaker dependent speech recognition models which are used in generating a speaker dependent garbage model is limited to a preselected maximum number which is empirically determined.

20 Claims, 11 Drawing Sheets

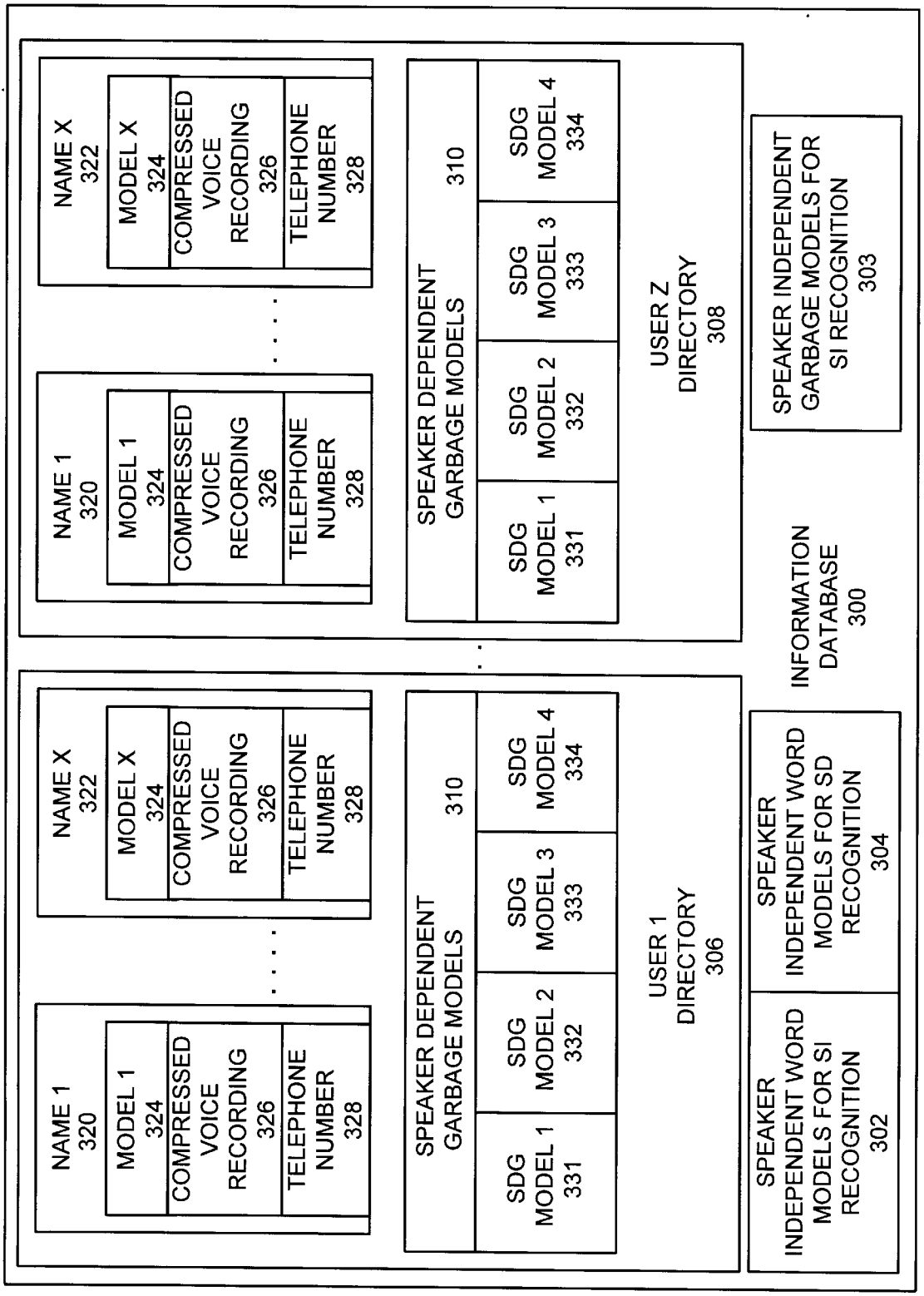

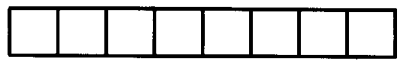
8 STATE SPEAKER DEPENDENT
SPEECH RECOGNITION MODEL
502
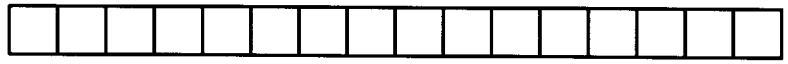
16 STATE SPEAKER DEPENDENT
SPEECH RECOGNITION MODEL
504
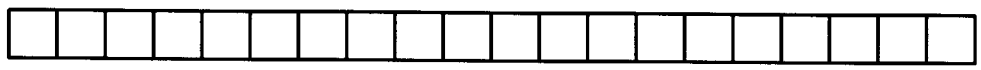
20 STATE SPEAKER DEPENDENT
SPEECH RECOGNITION MODEL
506
 SINGLE STATE SPEAKER
DEPENDENT SPEECH
RECOGNITION MODEL
508
FIG. 5

METHODS AND APPARATUS FOR GENERATING AND USING GARBAGE MODELS FOR SPEAKER DEPENDENT SPEECH RECOGNITION PURPOSES

RELATED APPLICATIONS

The present application is a continuation-in-part of U.S. patent application Ser. No. 08/609,029 filed Feb. 29, 1996, issued as U.S. Pat. No. 5,719,921, which is hereby expressly incorporated by reference.

FIELD OF THE INVENTION

The present invention relates to speech recognition systems and, more particularly, to methods and apparatus for generating and using garbage models in speaker dependent speech recognition applications.

BACKGROUND OF THE INVENTION

Speech recognition involves the identification of words or phrases in speech. It generally involves using a speech recognition system including, e.g., a computer, that analyzes the speech according to one or more speech recognition methods to identify the words or phrases included in the speech. Speech recognition may be either speaker dependent, speaker independent or a combination of both.

Speaker dependent speech recognition normally uses a computer that has been "trained" to respond to the manner in which a particular person speaks. In general, the training involves the particular person speaking a word or phrase, converting the speech input into digital signal data, and then generating a template or model of the speech which includes information about various characteristics of the speech. Because template and models include speech characteristic information, e.g., energy level, duration, and other types of information, templates and models are well suited for speech recognition applications where such characteristics can be measured in received speech and compared to the information included in the templates or models. For purposes of this application, the words templates and models are used interchangeably to refer to sets of speech characteristic information used for speech recognition purposes.

Models generated during a speech recognition training process are normally stored in a database for future use during a speech recognition operation. During real time speech recognition applications, input speech is processed in a manner similar to that used to generate models during training. The signal characteristic information or data generated by processing the speech upon which a recognition operation is to be performed is then normally compared to a user's set of speaker dependent models and/or speaker independent models. A match between the input speech and the models is determined in an attempt to identify the speech input. Upon recognition of a particular word or phase, an appropriate response is normally performed.

Speaker independent speech recognition normally uses composite templates or models or clusters thereof, that represent the same sound, word, or phrase spoken by a number of different persons. Speaker independent models are normally derived from numerous samples of signal data to represent a wide range of pronunciations. Accordingly, speaker independent speech recognition normally involves the training of models from a large database of utterances, e.g., of the same word or phrase, collected from a large number of different speakers. Speaker independent speech recognition models are designed to recognize the same word or phrase regardless of the identity of the speaker and the potential specific speech characteristics unique to an individual speaker.

Because speaker independent speech recognition models are normally trained from relatively large databases of information, it is often possible to generate meaningful information regarding a relatively large number of speech characteristics for use as a speaker independent speech recognition model. In contrast, speaker dependent speech recognition models are often generated from relatively few utterances, e.g., three utterances. Because of this, the number of meaningful speech characteristics that can normally be statistically modeled to a useful degree during speaker dependent model training is often lower than the number of characteristics that can be modeled in a meaningful way during speaker independent training. As a result, speaker independent speech recognition systems often use more complicated higher resolution, e.g., detailed, models than speaker dependent speech recognition systems.

The use of Hidden Markov Models ("HMMs") is one common approach to generating both speaker independent and speaker dependent speech recognition models. Other modeling techniques are also known. Various training techniques for generating HMMs from speech, e.g., utterances of a word or phrase are also known.

One known technique for using a speech recognition model to recognize speech is referred to a Viterbi search. In such a search, speech characteristic information generated from a received utterance is compared, as a function of time, to a plurality of potential paths where each path represents one potential speech recognition result. Each path may include a plurality of speech recognition models arranged according to grammar rules. Normally, where the goal is to recognize a single word, one distinct path will be used to represent each word which may be recognized by the speech recognition system. Such a path may include, e.g., silence models, preceding the model of the word to be recognized. The arrangement of speech recognition models (paths) formed by grammar rules of a given system will simply be referred to a system's grammar. In some embodiment's recognition of a word or phase corresponding to a particular path formed by the grammar of a system is normally declared when a score for the path exceeds a predetermined threshold. Ideally, the path that most closely matches the received speech will be the first to exceed the recognition threshold and be recognized.

Existing speech modeling and recognition techniques have been applied to a wide variety of applications including, e.g., telephone voice dialing services. Despite improvements in speech recognition modeling techniques in recent years, including the use of HMM models, errors in recognition results still occur. In order to reduce the number of false positive recognitions, i.e., where a speech recognition system incorrectly determines that an utterance includes a modeled word or phrase, some systems have incorporated the use of speaker independent garbage models. These models are also speaker independent, sometimes also referred to as out of vocabulary (OOV) models. Garbage models have been used to identify and reject certain words, phrases or sounds which are not included in the speech recognition systems vocabulary.

Speaker independent garbage models are normally created from a large database of utterances and are trained to model sound characteristics which distinguish sounds, utterances or words not included in a speech recognition system's word or phrase vocabulary from those that are.

Speaker independent garbage models have been used to model, e.g., the sound of coughs, uhm's and other non-significant sounds or words.

While the known modeling and speech recognition techniques have provided satisfactory recognition rates for many applications, undesirable erroneous recognition results still occur.

Erroneous recognition results are particularly a problem in the case of speaker dependent speech recognition applications where similar sounding words or names are to be recognized. This is because, as discussed above, speaker dependent speech recognition models are often trained using a rather limited number of training utterances resulting in somewhat less discriminating models than could be generated from a larger number of utterances. Speaker dependent recognition is often further complicated by the lack of useful speaker dependent garbage models. Unfortunately, in the case of speaker dependent speech recognition applications, the limited amount of data (utterances) available for training speaker dependent speech recognition models also makes the training of useful speaker dependent garbage models difficult to achieve.

Voice dialing is one example of a speech recognition application where a single user may have a plurality of like sounding names or names that sound similar to speaker independent commands, in a single directory. In as much as costs and wasted time may be associated with miss-identifications of names and/or voice dialing commands, e.g., in terms of misrouted calls, it is desirable to minimize erroneous speech recognition results.

In view of the above, it is apparent that there is a need to for methods and apparatus which can be used to improve speech recognition systems in general and to reduce erroneous recognition results in particular. In addition, there is a need for methods and apparatus for generating garbage models from a limited set of utterances so that useful speaker dependent garbage models can be created from a limited set of available information, e.g., the same information used to create speaker dependent speech recognition models.

SUMMARY OF THE PRESENT INVENTION

The present invention relates to methods and apparatus for generating and using both speaker dependent and speaker independent garbage models in speaker dependent speech recognition applications.

Speaker independent garbage models have been used in various systems to reduce the risk of erroneous speech recognition results in speaker independent speech recognition applications. The speaker independent garbage models used in the past have served to identify and filter out sounds and utterances which are not included in the vocabulary of words and/or phases which the speech recognition system is intended to identify. Speech or utterances which correspond to a garbage model is usually ignored as unimportant, e.g., noise or other acoustic signals which are outside the system's vocabulary and which act as distractions when attempting to recognize in-vocabulary words.

The present invention recognizes that in some speech recognition systems, e.g., systems where multiple speech recognition operations are performed on the same signal, it can be desirable to recognize and treat words or phrases in one part of the speech recognition system as garbage or out of vocabulary utterances with the understanding that these words or phrases will be recognized and treated as in-vocabulary by another portion of the speech recognition system. The use of what may be referred to as explicit garbage models in accordance with the present invention to model words recognized by another part of the system reduces the risk of conflicting speech recognition results. This is particularly important in a system wherein multiple, e.g., speaker independent and speaker dependent, speech recognition operations are performed in parallel.

As discussed above, in the context of speaker dependent speech recognition applications, very little data normally exists from which to create speaker dependent garbage models. The present invention overcomes this problem through the use of a new and novel garbage model generation technique.

In accordance with one embodiment of the present invention, speaker dependent garbage models are generated from the very same data used to generate speaker dependent speech recognition models, e.g., word models. The technique involves processing the generated word speech recognition models to create one or more speaker dependent garbage models from the data included therein.

The technique of the present invention involves what may be described as distorting or morphing of the speaker dependent speech recognition models to generate the speaker dependent garbage model therefrom. One or more speaker dependent speech recognition models are then combined with the distorted model to generate the garbage model therefrom. In one embodiment, the distorting process involves what may be characterized as a model flattening process which involves generating a average feature vector from a word model which is then replicated to fill each state of a speaker dependent garbage model. The feature vectors of individual word models are then averaged on a state-by-state basis with the feature vectors of speech recognition word models to generated an updated speaker dependent garbage model.

In accordance with the present invention, speaker dependent garbage models are generated and updated when speaker dependent speech recognition models are trained. In one embodiment the speaker dependent speech recognition models are used during recognition by placing them on a grammar arc in parallel with one or more speaker dependent speech recognition models from which they were generated. If a speaker dependent garbage model is recognized over a speaker dependent speech recognition model, the utterance which was recognized as corresponding to a garbage model is treated as being an out of vocabulary utterance.

In one embodiment, scoring weights used during recognition to score the speaker dependent garbage models are adjusted as a function of the number of utterances or speech recognition models which were used in the creation of the speaker dependent garbage model. In this manner, less accurate garbage models generated from a very limited number of utterances are given less weight than garbage models generated from a larger number of utterances or speaker dependent speech recognition models.

Various other features of the new and novel speaker dependent garbage model generation process of the present invention are discussed below in the detailed description which follows.

Numerous additional features, embodiments and advantages of the present invention are described below in the detailed description which follows. While such embodiments will frequently be described in the context of a voice dialing embodiment, it is to be understood that the described features of the present invention are not so limited and are applicable to numerous other speech recognition applications as well.

BRIEF DESCRIPTION OF THE DRAWINGS

FIG. 3 illustrates an information database suitable for use as the information database of FIG. 1.

FIG. 5 illustrates a plurality of speech recognition models each having a different numbers of states.

DETAILED DESCRIPTION

Figure 1:
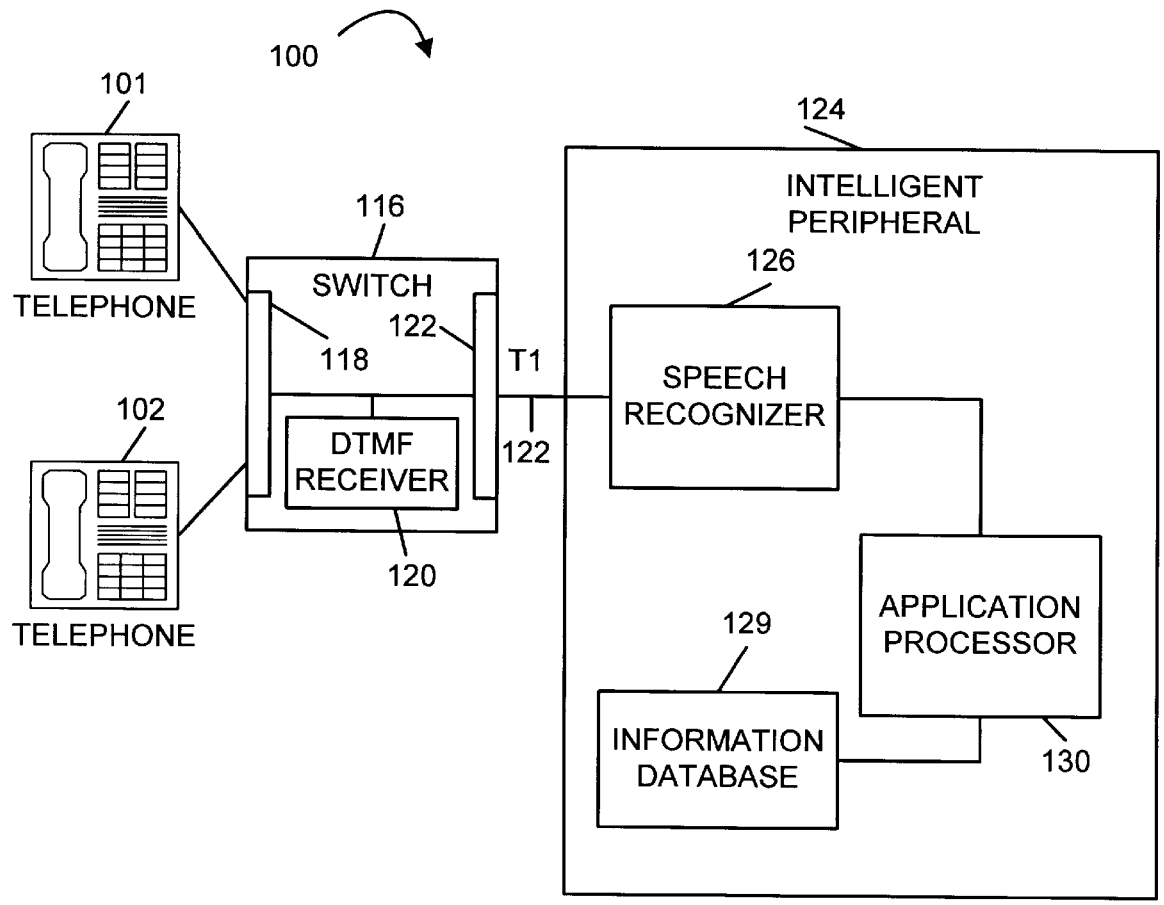
FIG. 1 illustrates a telephone system including a speech recognizer implemented in accordance with the present invention.

As discussed above, present invention relates to methods and apparatus for generating and using both speaker dependent and speaker independent garbage models in speaker dependent speech recognition applications. FIG. 1 illustrates one representative application, e.g., a voice dialing application, which will be used for purposes of explaining the present invention.

FIG. 1 illustrates a telephone system 100 which provides speech controlled telephone services in accordance with one embodiment of the present invention. The telephone system 100 comprises a plurality of telephones 101, 102 which are coupled to a switch 116.

The switch 116 includes a telephone interface 118, a digit receiver 120 and a T1 interface 122. The telephone interface 118 is used to couple the telephones 101, 102 to the digit receiver 120 and the T1 interface 122.

The digit receiver 120 monitors signals received via the interface 118 and/or T1 interface 122 to detect DTMF tones representing a destination telephone number. Upon detecting DTMF tones representing a destination telephone number, the digit receiver 120 routes the call in response to the destination represented by the DTMF tones. The call is routed via, e.g., a telephone network coupled to the switch 116.

The T1 interface 122 is coupled to an intelligent peripheral 124 via the illustrated T1 link. As is known in the art, the illustrated T1 link is capable of handling 24 separate voice channels.

The intelligent peripheral 124 is used to control the switch 116, e.g., to place a call in response to speech. Communication of switch control information between the intelligent peripheral 124 and the switch 116 is conducted in accordance with a method described in U.S. patent application Ser. No. 08/267,792 filed Jun. 28, 1994 which is hereby expressly incorporated by reference.

The intelligent peripheral 124 includes a speech recognizer array 126, an application processor 130, and an information database 129. The speech recognizer array 126 is coupled to the T1 link and to the application processor 130. The application processor 130, in turn, is coupled to a database 129, which includes, e.g., a customer list, a set of user dependent speech templates for each customer, a list of telephone numbers, and other information including, e.g., speaker independent voice recognition models and speaker independent garbage models. While the intelligent peripheral 124, for exemplary purposes, is illustrated as including a single speech recognizer array 126 it is to be understood that it may include any number of such arrays.

Figure 2A:
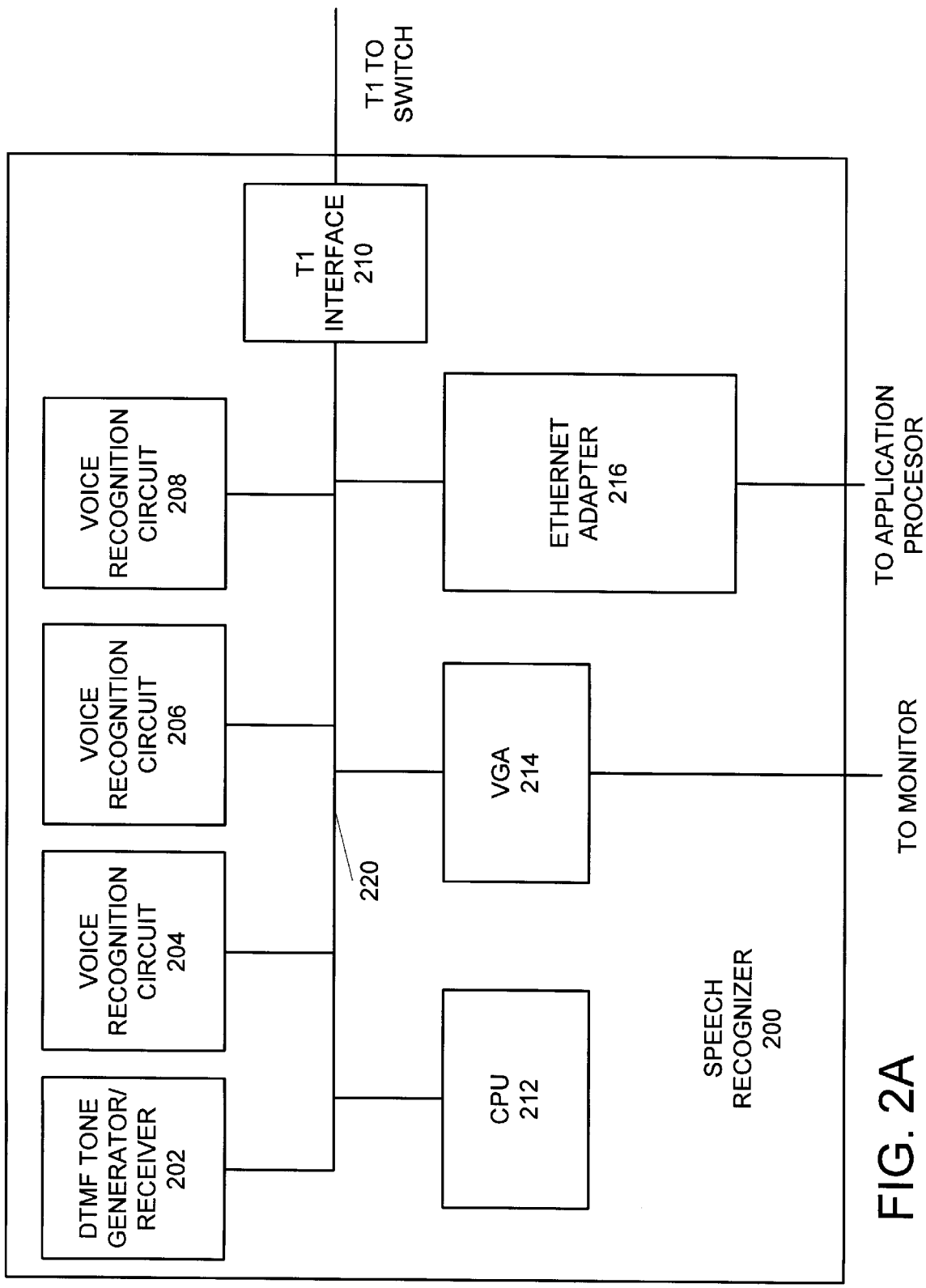
FIG. 2A illustrates a speech recognizer suitable for use in the speech recognition system illustrated in FIG. 1.

Referring now to FIG. 2A, there is illustrated an exemplary speech recognizer array 200 which may be used as the speech recognizer array 126.

The speech recognizer array 126 comprises a T1 interface 210, first through third voice recognition circuits 204, 206, 208, a DTMF tone generator/receiver circuit 202, a central processing unit 212, a VGA graphics card 214 which is coupled to a monitor, and an Ethernet adapter 216. The Ethernet adapter 216 is used to couple the speech recognizer array 200 to the application processor 130.

The T1 interface card 210 is coupled to the T1 link and is responsible for supplying voice channels to the voice recognition circuits 204, 206, 208 and the DTMF tone generator circuit 202 via a first data bus 218, e.g., a MITEL ST-Bus™ bus. A second bus 220, which is a host computer bus is coupled to the T1 interface, first through third voice recognition circuits 204, 206, 208, DTMF generator 202, CPU 212, graphics card 214 and Ethernet adapter 216.

The T1 interface 210 routes each of the 24 voice channels of the T1 link to one of the three voice recognition circuits 204, 206, 208. In the illustrated embodiment, each voice recognition card 204, 206, 208 handles 8 voice channels. The DTMF tone generator/receiver 202 is responsible for generating the DTMF tones required to place a call and for detecting DTMF tones, e.g., *99, representing a specific mode of operation, e.g., directory mode. The CPU 212 is responsible for controlling the operation of the various components of the speech recognizer array and the transfer of data to and from the application processor 130 via the Ethernet adapter 216. Operation of the voice recognition circuits 204, 206, 208 will be discussed in detail below.

Figure 2B:
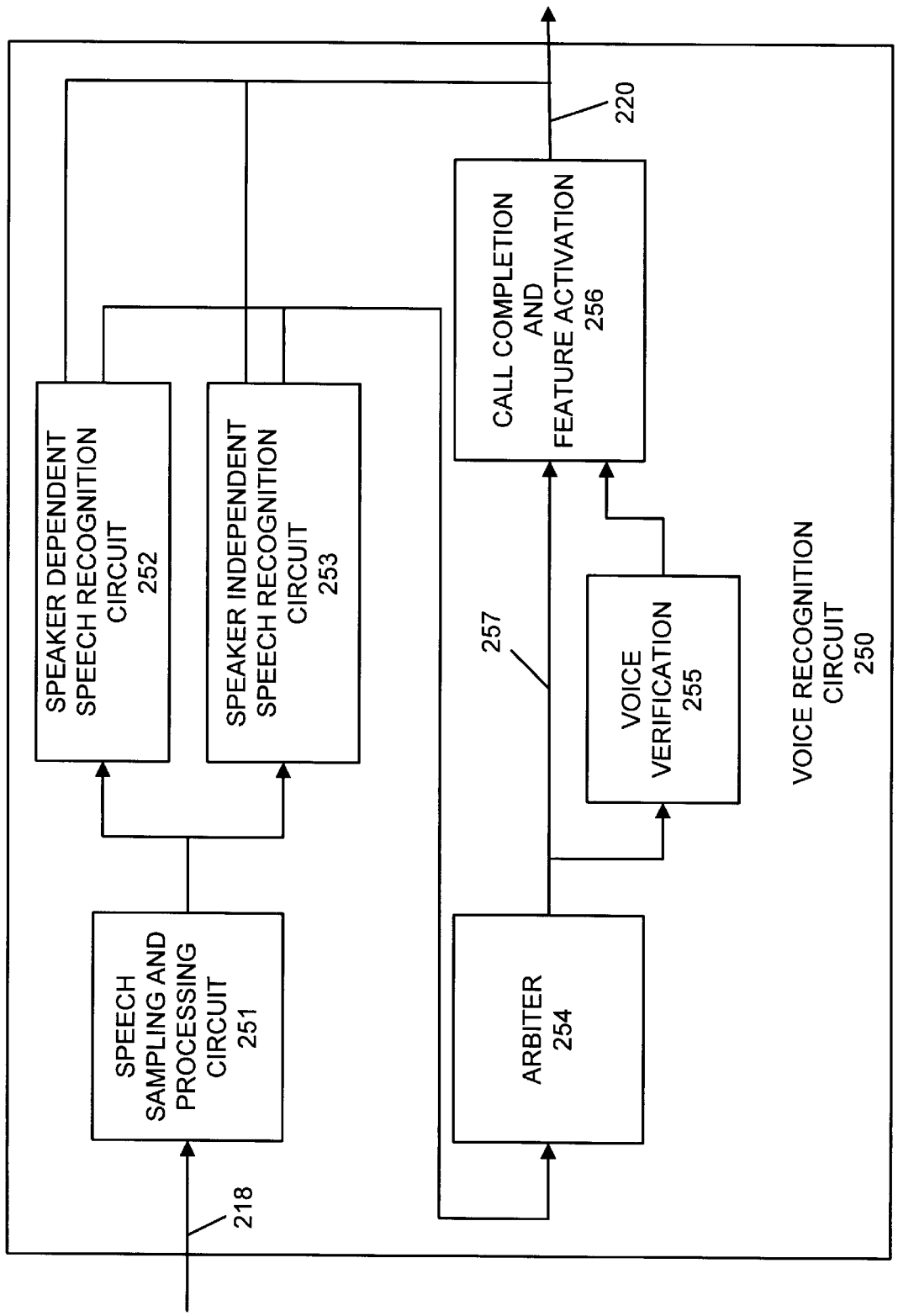
FIG. 2B illustrates a voice recognition circuit implemented in accordance with one embodiment of the present invention which performs speaker dependent speech recognition and speaker independent speech recognition in parallel.

A voice recognition circuit 250 suitable for use as one of the voice recognition circuits of FIG. 2A, is illustrated in FIG. 2B. The voice recognition circuit 250 comprises a speech sampling and processing circuit 251 which is coupled to the voice bus 220 for receiving speech therefrom. The output of the speech sampling and processing circuit 251 is coupled to the inputs of a speaker dependent speech recognition circuit 252 and a speaker independent speech recognition circuit 253 which are arranged in parallel.

In one embodiment, the speaker independent speech recognition circuit 253 operates to detect explicit network control commands such as "REPEAT DIALING", "CALL FORWARD", "CALL TRACE", etc. The speaker dependent speech recognition circuit, on the other hand, is used to identify, e.g., names of individuals, which were included in a voice dialing customer's speaker dependent voice dialing directory.

The speech recognition circuits 252, 253, which operate in parallel on the same signal, are both coupled to the data bus 220. Via the data bus 220 speech recognition models including garbage models, can be transferred between the information database 129 and the speech recognition circuits 252, 253 through the use of the application processor 130. The outputs of the speaker dependent and speaker independent speech recognition circuits 252, 253 are coupled to an arbiter 254. The arbiter 254 is responsible for arbitrating between conflicting speech recognition results that can occur from the independent parallel operation of the speaker dependent speech recognition circuit 252 and speaker independent speech recognition circuit 253.

The arbiter 254, in turn, is coupled to a call completion and feature activation circuit 256 by a line 257 and by a voice verification circuit 255. Using this arrangement, voice verification is performed selectively when, for security purposes, it is important to verify the identity of a caller before responding to a particular command.

The voice recognition circuit 250 may include additional feedback loops and circuits for requesting additional information from a caller as may be required depending on a particular application.

Referring now to FIG. 3, there is illustrated an information database 300 which may be used as the information database 129 illustrated in FIG. 1. The database 300 includes both speaker dependent and speaker independent speech recognition data, e.g., models, in addition to other information relating to the voice dialing system of the present invention. In particular, the information database 300 includes speaker independent speech recognition models 302, e.g., for recognizing network control commands such as "CALL FORWARDING" and "CALL TRACE". Of particular importance are a number of speaker independent word models 304 for some of the words used as part of the network control commands, e.g., "CALL", "FORWARDING", etc. These models are built of the same size and structure as speaker dependent name models 324 and are given a status of "garbage models". These "explicit garbage models" 304 are used by the speaker dependent speech recognition circuit 252 to recognize and reject one or more of the words used in the commands recognized by the speaker independent speech recognition circuit 253. The database 300 also includes a plurality of conventional speaker independent garbage models 303 to be used during speaker independent speech recognition operations.

In addition to the speaker independent speech recognition data, the database 300 also includes a plurality of user directories 306, 308 each of which includes speaker dependent speech recognition information, e.g., name word models. In the illustrated embodiment a different user directory 306, 308 is associated with each user, e.g., voice dialing subscriber. The individual user directors include a set of speaker dependent garbage models 310, and plurality of name information sets 320, 322 corresponding to different names included in the individual user's speaker dependent voice dialing directory 306, 308. Each name information set includes a speaker dependent name model 324, a compressed voice recording of the modeled name 326, and a telephone number to be dialed upon recognition of the modeled name. The voice recording may be played back to the system user upon recognition of a corresponding name for confirmation purposes.

Figure 4:
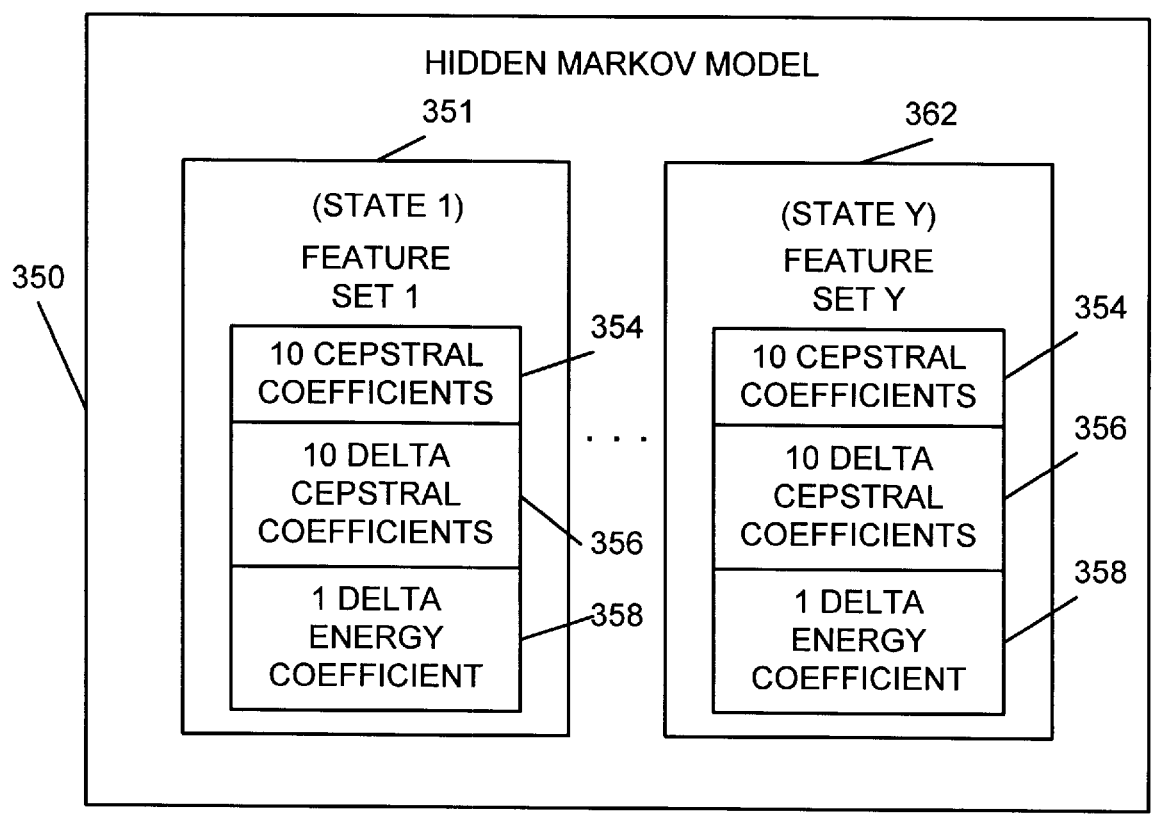
FIG. 4 illustrates a Hidden Markov Model (HMM model) suitable as a word model in accordance with one embodiment of the present invention.

Referring now briefly to FIG. 4, there is illustrated an HMM 350 which may be used as any one of the speaker dependent speech recognition name models illustrated in FIG. 3. As illustrated the HMM 350 includes a plurality of states represented by feature sets 351, 362. While any number of states (feature sets) may be used, in accordance with one exemplary embodiment of the present invention a preselected fixed number of states, e.g., 8, 16 or 20 are used to model individual names and/or words. The number of states used to model any given utterance (word or name) is determined at training time as a function of the duration of the utterance representing the name or word. FIG. 5 illustrates 8, 16 and 20 state word models, 502, 504, 506, respectively, which are used to model names in accordance with the present invention. In addition to 8, 16 or 20 state word models, a single state speaker dependent garbage model 508 is used in accordance with the present invention for word spotting and rejection purposes. In the FIG. 5 illustrations, each small box represents a feature set corresponding to one state.

Referring once again to FIG. 4 it can be seen that each state of a word model is represented by one feature set 351, 362 also referred to herein as a feature vector. Feature sets may include information about a plurality of different signal characteristics including time dependent signal characteristics. In the illustrated embodiment, each feature set 351, 362 includes 10 cepstral coefficients 354, 10 delta cepstral coefficients and 1 delta energy 358. The different coefficients represent what are sometimes referred to as different dimensions of the feature set or feature vector. Accordingly, the feature sets 351, 362 illustrated in FIG. 4 may be characterized as 21 dimensional (21-D) feature vectors.

In one embodiment, 21-D feature vectors, such as those illustrated in FIG. 4, are used in to generate the speaker dependent speech recognition models to recognize, e.g., names. More complex speaker independent speech recognition models including feature vectors having a larger number of dimensions are used by the speaker independent speech recognition circuit 253 of the present invention to recognize, e.g., network control commands.

In accordance with the speaker independent garbage modeling feature of the present invention, two sets of speaker independent word models are generated for all or some of the commands which are to be recognized by the speaker independent speech recognition circuit 253. A first more complex set of speaker independent models 302 is used by the speaker independent speech recognition circuit for speech recognition purposes. A second set of speaker independent speech recognition models is used by the speaker dependent speech recognition circuit 252 as garbage models, e.g., for the purpose of recognizing the same words or commands as the speaker independent speech recognition circuit 253 and then rejecting these words or commands as being out of the speaker dependent speech recognition circuit's vocabulary. In accordance with the present invention, the second set of speaker independent speech recognition models, generated for use as garbage models, include feature vectors having the same dimensionality as the speaker dependent word models used by the speaker dependent speech recognition circuit 252.

Referring once again to FIG. 3, it can be seen that four speaker dependent garbage models, 331, 332, 333, 334 are used. The speaker dependent garbage models 331, 332, 333, 334 have 8, 16, 20 and 1 states, respectively. Each one of the speaker dependent garbage models is generated, in accordance with the present invention, as a function of some or all of the speaker dependent name models included in a user's directory 320, 322 having the same number of states as the garbage model. In one embodiment, the single state speaker dependent garbage model 334, as will be discussed below, is generated as a function of the name models 320, 322 regardless of the number of states included in the models.

Figure 6:
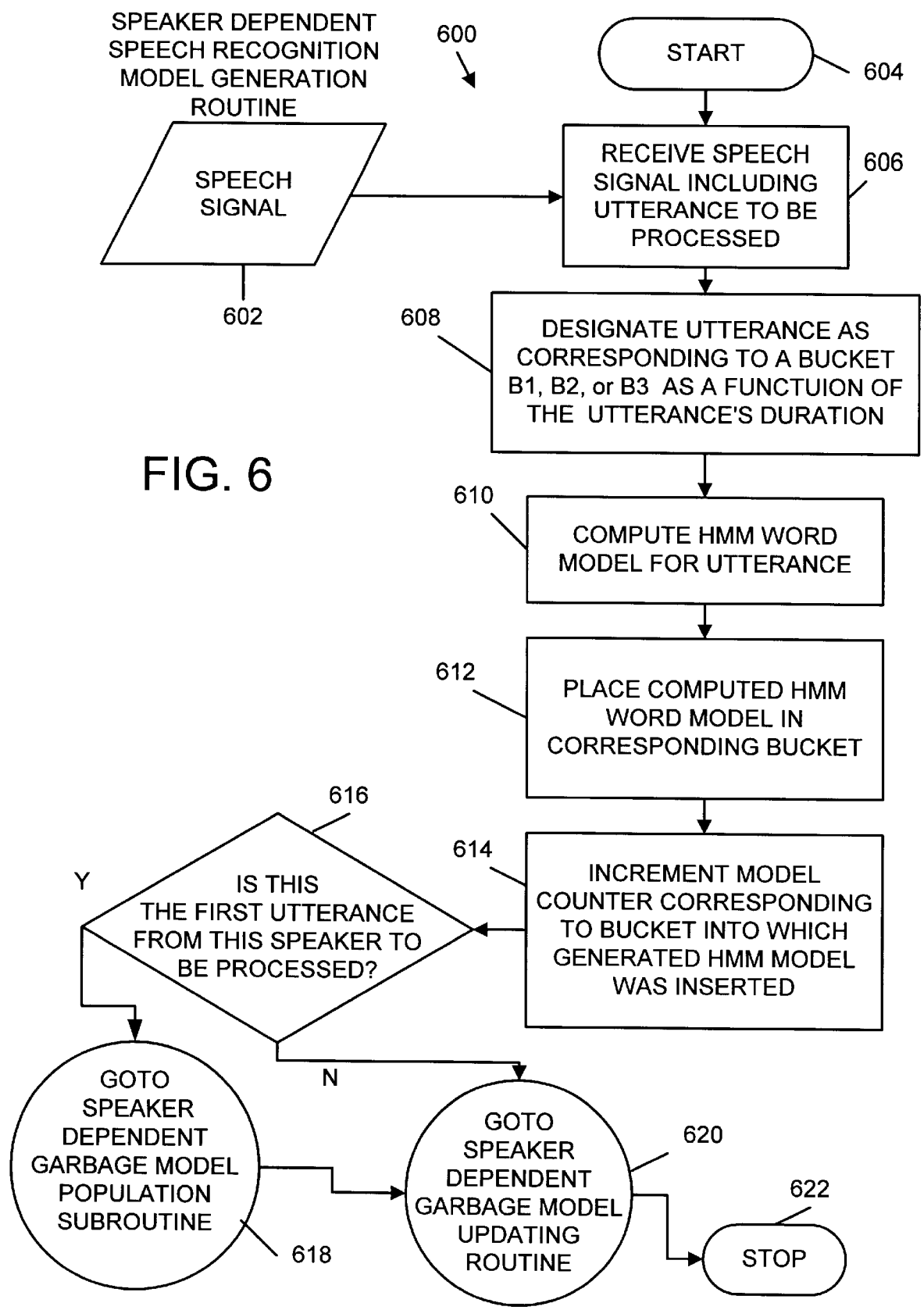
FIG. 6 illustrates a speech recognition model generation routine implemented in accordance with one embodiment of the present invention.

The new and novel speech recognition model generation routine 600 of the present invention, which generates speaker dependent garbage models from the same speaker dependent data as speech recognition models, will now be described with reference to FIG. 6. The routine 600 may be implemented using the same general circuitry used to perform a speech recognition operation, e.g., the circuitry illustrated in FIGS. 2A and 2B. Various portions of the routine 600 and subroutines of the present invention may be implemented as software, e.g., to be executed by the CPU 212.

As illustrated the routine 600, begins with the start step 604 wherein various system initialization operations occur. Operation then proceeds to step 606 wherein the speech signal 602, from which a speech recognition model is to be generated, is received. The received speech may represent, e.g., a name to be added to a particular user's voice dialing directory 306.

After receipt of the speech signal 606 operation proceeds to step 608. In step 608, the duration of the utterance included in the received signal is measured and a determination made as a function of the measured duration as to how many states should be used to model the utterance. As discussed above, 8, 16, or 20 states are used for speaker dependent models in the exemplary embodiment. In accordance with the present invention, speaker dependent speech recognition models are arranged into groups referred to as buckets, each group or bucket includes models having the same number of states. Thus, in the exemplary embodiment, three distinct buckets are used, a first bucket B1 corresponding to 8 state models, a second bucket B2, corresponding to 16 state models, and a third bucket B3 corresponding to 20 state models. Accordingly, step 608 involves assigning the utterance to be modeled to one of the three buckets B1, B2, B3 as a function of the utterance's duration.

Once an utterance has been assigned to a bucket, the next step, step 610, involves computing a speaker dependent speech recognition model, e.g., an HMM word model, for the utterance. The HMM word model may be generated using known techniques. Once generated, the HMM word model is placed in the bucket B1, B2, or B3 which was designated as corresponding to the utterance.

In accordance with the present invention, a counter is associated with each of the three buckets B1, B2, B3. Whenever a speaker dependent word model is added to a user's directory the counter associated with the bucket B1, B2, or B3, to which the model is added, is incremented. Similarly, if a model is deleted, e.g., by a user removing a name from the user's directory, the model is removed from the corresponding bucket and the bucket's counter is decremented accordingly.

After the computed HMM model is placed in the corresponding bucket in step 612 operation progresses to step 614. In this step, the bucket counter corresponding to the bucket into which the HMM model was inserted is incremented to reflect the addition of the HMM model. A determination is then made in step 616 at to whether the received utterance is the first utterance from the particular speaker, i.e., if the speaker is a new speaker for which speaker dependent speech recognition models are being generated for the first time. If in step 616 it is determined that the received utterance is the first utterance from the particular speaker, operation progresses to step 618 which involves a call to the garbage model population subroutine 700.

Figure 7:
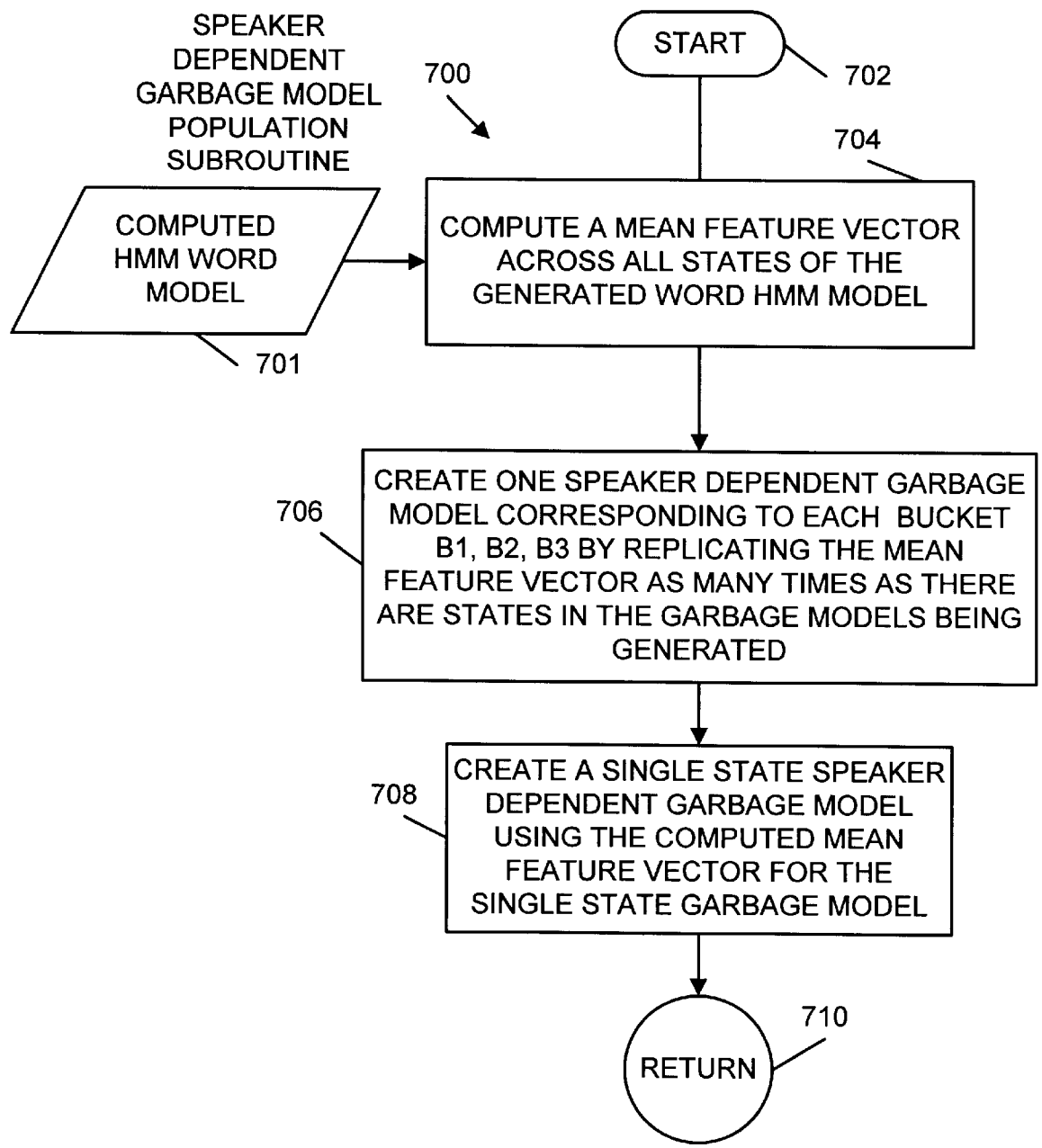
FIG. 7 illustrates a garbage model population subroutine implemented in accordance with the present invention.

The garbage model population subroutine 700, illustrated in FIG. 7, is directed to addressing the need to generate initial speaker dependent garbage models (seeds) 331, 332, 333 corresponding to each of the three buckets B1, B2, B3 as well as a single speaker dependent word spotting garbage model 334.

The garbage model population subroutine 700 begins with the start step 702, wherein various initialization operations are performed. Operation progresses to step 704 wherein a mean feature vector is computed across all states of the computed word model previously generated from the received utterance in, e.g., step 610. Generation of the mean feature vector involves averaging, e.g., the first coefficients of each of a plurality of states included in a model together to generate a first mean coefficient value. The second coefficients of each state of a model are then averaged together to generate a second mean coefficient value, and so on. The result is the generation of, e.g., 21 mean coefficient values, representing a 21-D mean feature vector, from a model using 21-D feature vectors to represent each state. In one embodiment, a weighted mean is used in generating the mean feature vector, that is the number of times a state has been visited is included in the computation.

The mean feature vector generated in step 704 is used in step 706 to generate one garbage model for each of the buckets B1, B2, B3. In step 706 this is done by replicating the mean feature vector computed in step 704, to populate each state of the garbage models (seeds) 331, 332, 333 being generated. This results in three flat speaker dependent garbage models 331, 332, 333 which were generated from the first utterance received from a particular user. At this stage in the garbage model generation process, the first speaker dependent garbage model 331, corresponding to bucket B1, will have 8 states each represented by the computed mean feature vector. The second speaker dependent garbage model 332, corresponding to bucket B2, will have 16 states each represented by the computed mean feature vector. Similarly, the third speaker dependent garbage model 333, corresponding to bucket B3, will have 20 states each represented by the computed mean feature vector.

After generation of the first through third speaker dependent garbage models 331, 332, 333, operation progresses to step 708 wherein the single state speaker dependent word spotting garbage model 334 is generated using the computed mean feature vector to represent the single state of the garbage model 334.

Once the speaker dependent garbage models are populated via the above garbage model generation process, operation returns from the garbage model population subroutine 700 in step 710, to the speaker dependent speech recognition model generation routine 600 and step 620 in particular.

When, in step 616, it is determined that the received utterance is not the first utterance from the speaker to be processed, operation progresses directly to step 620. Thus, the garbage model population subroutine 700 is called only the very first time an utterance from an individual user is processed.

Figure 8A:
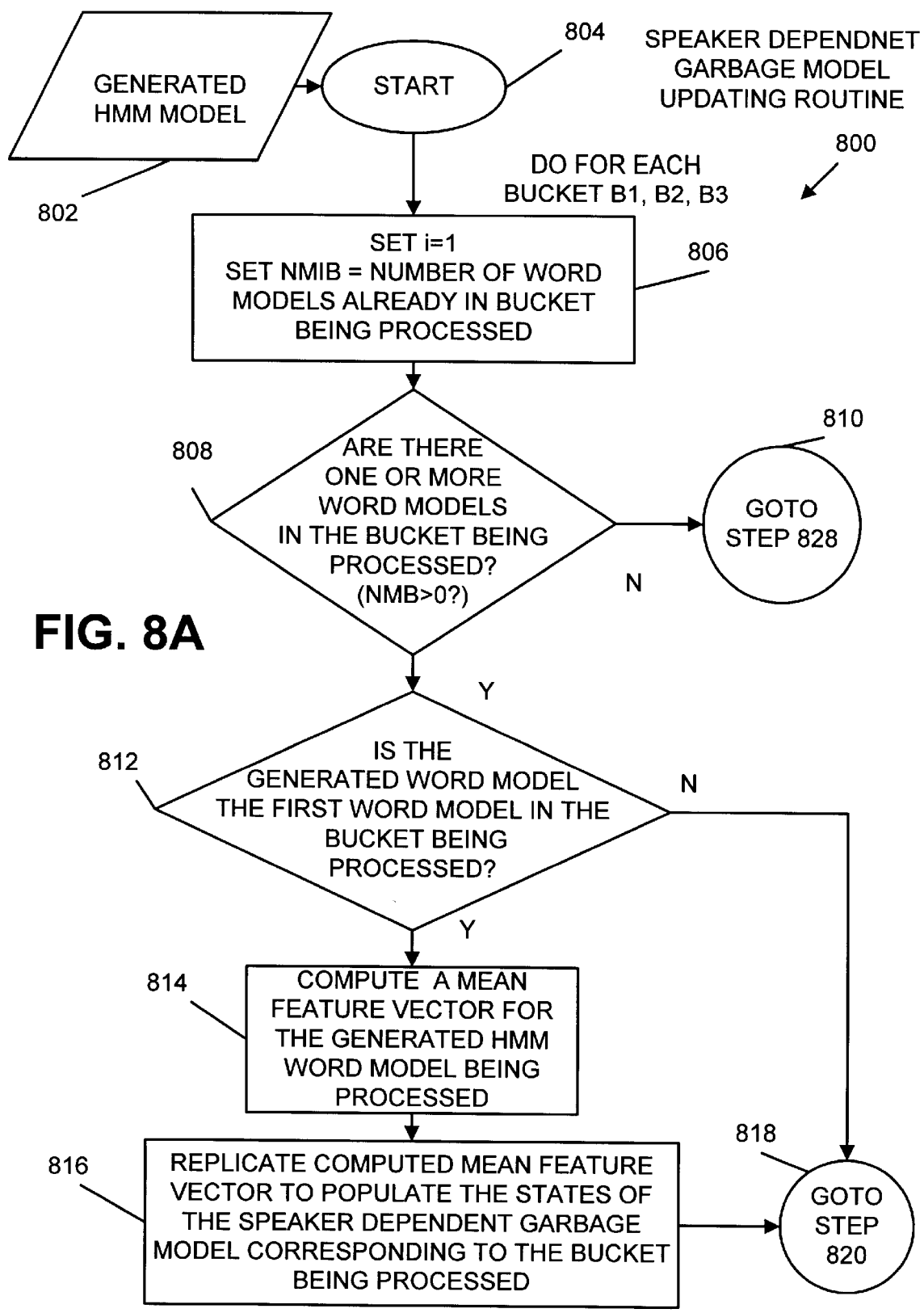
FIG. 8, which comprises the combination of FIGS. 8A and 8B, illustrates a garbage model updating routine implemented in accordance with one embodiment of the present invention.
Figure 8B:
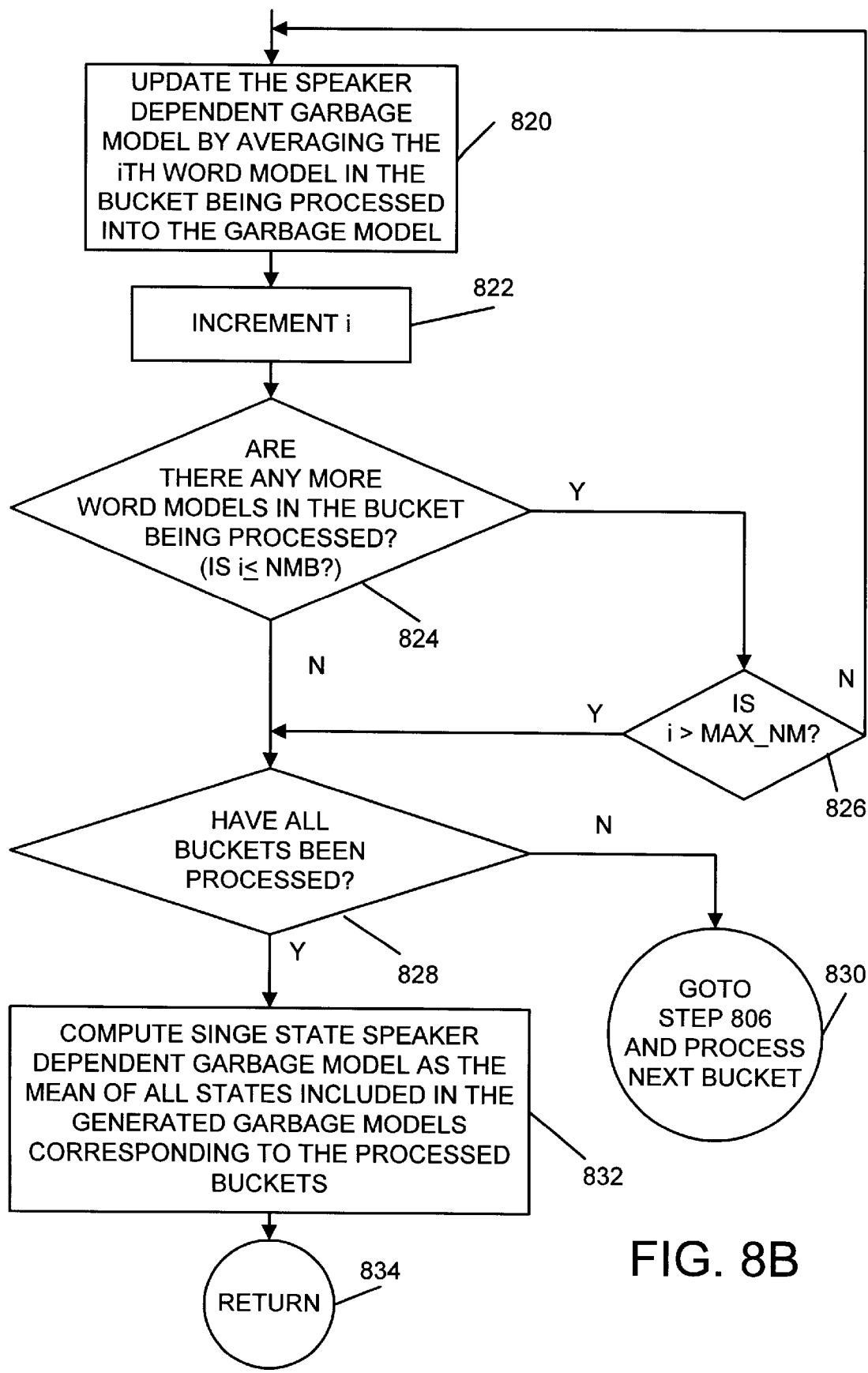

In step 620, a call is made to the speaker dependent garbage model updating routine 800 illustrated in FIGS. 8A and 8B. The updating routine 800 begins in step 804, wherein various routine initialization operations are performed and the generated HMM model 802 is received from the model generating routine 600.

The updating routine 800 includes a series of steps 806 through 826 which are followed for each of the buckets B1, B2, B3 for which a corresponding speaker dependent garbage model 331, 332, 333 was generated.

In accordance with one embodiment of the present invention, these steps are followed for each bucket every time a new speaker dependent model is generated even though the addition of a speaker dependent model to one bucket will not normally affect the garbage models corresponding to the other buckets. In effect, the addition of a model to a user's directory is used as a trigger mechanism to cause the updating of the speaker dependent garbage models to take into consideration changes in the user's directory which may be the result of, e.g., deletion of sine if the speaker dependent name models.

Referring now to FIG. 8A, it can be seen that operation progresses to step 806 from the start step 804.

In step 806 various parameters, associated with the updating of a bucket's corresponding garbage model, are initialized. In particular a loop counter, i, is set to 1 and a variable NMIB (representing the number of models in a bucket available for processing) is set to equal the number of word models in the bucket being processed.

From step 806, operation progresses to step 808 wherein a determination is made if there are one or more word models in the bucket being processed. If there are no word models in the bucket being processed, no updating of the garbage model corresponding to the bucket being processed is performed, and operation progresses to step 828 via the GOTO step 810.

However, if in step 808 it is determined that there are one or more models in the bucket being processed operation progresses to step 812. In step 812 a determination is made as to whether the generated word model 802 is the first word model in the bucket being processed. If the answer to this inquiry is yes, it indicates that a new starting garbage model for the bucket being processed should be generated, e.g., to replace the garbage model generated by the speaker dependent garbage model population subroutine 700. A yes answer in step 812 results in operation progressing to step 814 wherein a mean feature vector is computed for the generated HMM model 802 being processed. The mean feature vector may be computed as described above in regard to step 704.

After computation of the mean feature vector, in step 816, the mean feature vector is replicated to populate the states of a speaker dependent garbage model which is used to replace the previously generated speaker dependent garbage model corresponding to the bucket being processed. Operation then progresses, via the GOTO step 818, to step 820.

If in step 812 it was determined that the generated word model 802 is not the first word model in the bucket being processed, operation progresses immediately to step 820 via step 818, bypassing steps 814 and 816.

In step 820, the existing speaker dependent garbage model corresponding to the bucket being processed is updated by averaging the $i^{th}$ word model in the bucket being processed into the garbage model on a state by state basis. That is, the feature vector coefficients representing the first state of the $i^{th}$ word model being processed are averaged with the corresponding feature vector coefficients of the first feature vector representing the first state of the existing garbage model to generate a feature vector representing the first state of an updated garbage model. A similar averaging process is performed for each remaining feature vector of the word model and corresponding feature vector of the garbage model being processed.

After updating of the garbage model using the $i^{th}$ word model, i is incremented in step 822 and then operation proceeds to step 824. In step 824 a determination is made as to whether there are any more models in the bucket being processed. If the answer is yes, operation proceeds to step 826 wherein a determination is made as to whether a maximum threshold number of models (MAX_NM) to be used in generating the garbage model has been reached. That is, a determination is made as to whether or not i exceeds the maximum number of models to be used in generating the garbage model. If the value of i does not exceed the maximum number of models to be used in generating the garbage model, operation progresses to step 820 and the garbage model is again updated, e.g., using the next word model in the bucket being processed.

However, if the value of i exceeds the value MAX_NM then operation progresses from step 826 to step 828. The value MAX_NM is an empirically determined value. Test results have shown that using large numbers of word models in the described garbage model updating process, will in some cases, actually result in decreased system performance. Thus, it may be desirable to limit the number of speaker dependent word models used in generating a speaker dependent garbage model, e.g., to five. In accordance with the present invention, the preselected limit MAX_NM serves as a check or restriction on the number of speaker dependent speech recognition models that will be used in generating any one speaker dependent garbage model 331, 332, 334.

Operation will progress from step 824 to step 828 if all the models in a bucket being processed have been used. Accordingly, steps 824 and 828 serve the purpose of determining when the garbage model updating process associated with a particular bucket of speaker dependent speech recognition models has been completed.

In step 828 a determination is made as to whether or not all the speaker dependent speech recognition word model buckets B1, B2, B3 have been processed. If the answer to this inquiry is no, operation progresses to step 806 via step 830 and the next bucket of speaker dependent word models is processed.

If, however, in step 828 it is determined that all the speaker dependent speech recognition word model buckets B1, B2, B3 have been processed operation progresses to step 832 wherein a new single state speaker dependent garbage model 334 is generated. The single state speaker dependent garbage model 334 is computed as the mean of all states included in the generated garbage models 331, 332, 333 corresponding to the processed buckets B1, B2, B3, respectively. Accordingly, in this embodiment, the feature vector representing the single state garbage model 334 is generated as the mean of the feature vectors of 44 different states, e.g., the 8 states of garbage model 331, the 16 states of garbage model 332, and the 20 states of garbage model 333. The mean feature vector computation may be calculated in a manner that is the same as or similar to that described above in regard to step 704.

Upon the completion of step 832, all four of a speaker's speaker dependent garbage models 331, 332, 333, 334 will have been updated if it was appropriate to do so. From step 832 operation progresses to step 834 which results in a return to the speaker dependent speech recognition model generation routine 600. Upon return to the model generation routine 600 operation progresses to the stop step 622 wherein operation is stopped awaiting the receipt of a new speech signal 602 including an utterance to be processed by the model generation routine 600.

Figure 9:
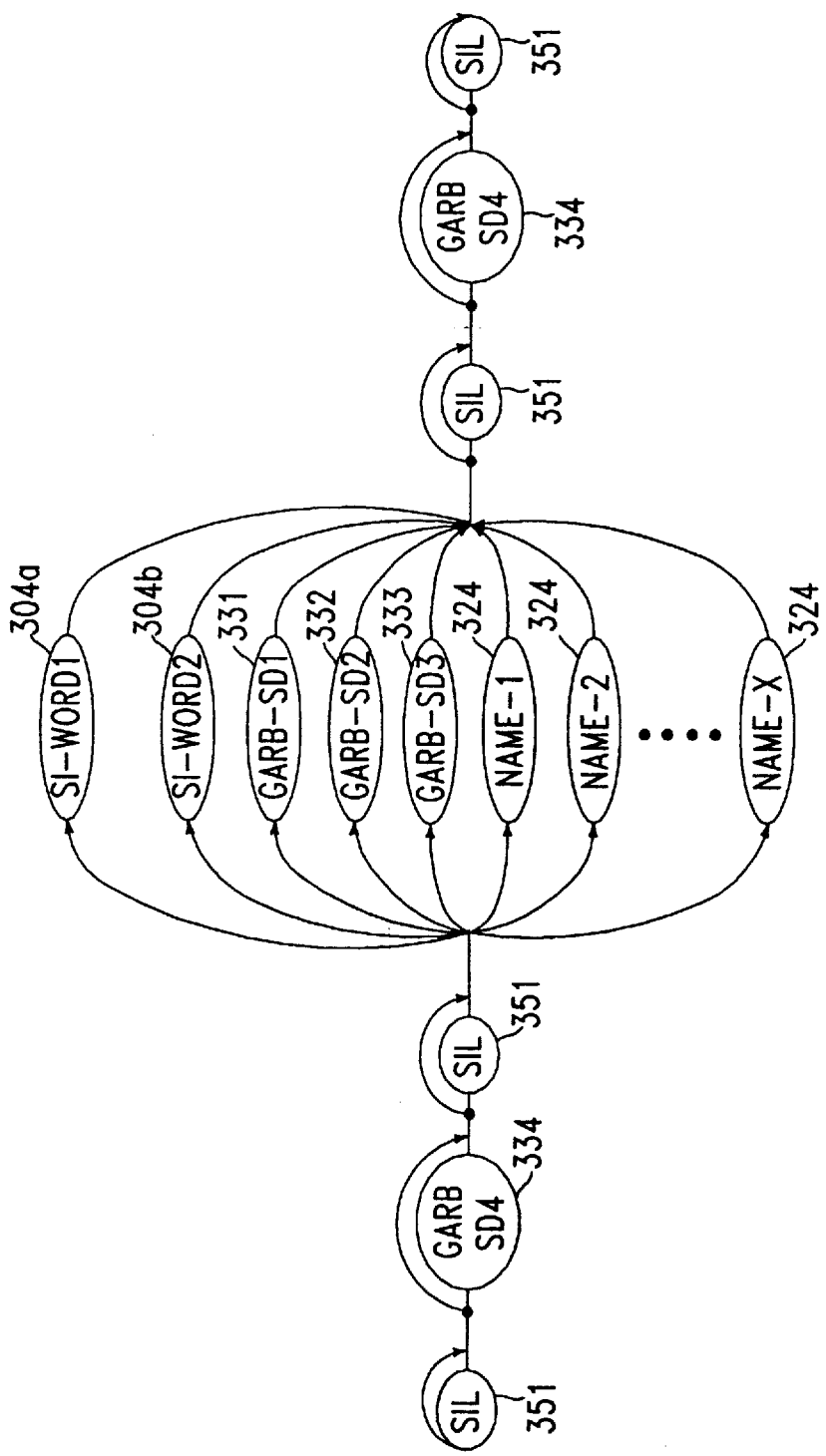
FIG. 9 illustrates a plurality of speech recognition possibilities, represented in the form of paths, generated by the illustrated grammar, parameters, and models which are used as part of a speech recognition operation in accordance with one embodiment of the present invention.

FIG. 9 illustrates a plurality of speech recognition possibilities, which are considered, e.g., as part of a Viterbi search, performed by the speaker dependent speech recognition circuit 252 when performing a speech recognition operation. As illustrated, in accordance with the present invention, the three speaker dependent speech recognition garbage models 331, 332, 333 are placed on grammar arcs in parallel with the speaker dependent speech recognition models 324 of the names to be identified. In addition, note that the single state speaker dependent garbage model 334 is placed by the grammar both preceding and subsequent to the speaker dependent name models 324 for word spotting and rejection purposes.

As discussed above, one or more explicit speaker independent garbage models represented in FIG. 9 as models 304a and 304b, are also inserted on grammar arcs in parallel with the speaker dependent name models in an attempt to identify words or phrases, e.g., explicit commands, which the speaker independent speech recognition circuit 253 is designed to identify. Thus, the generated speaker dependent garbage models compete directly with the speaker dependent name models in the speaker dependent speech recognition process.

In addition to the above described models, FIG. 9 illustrates the use of a plurality of silence models 351.

In accordance with one feature of the present invention, weights are used to adjust the scoring of speaker independent and speaker dependent garbage models at speech recognition time. These weights are used to modify the scoring of the garbage models and thus how they will compete with the speaker dependent name models 324.

In the embodiment of the present invention illustrated in FIG. 9, the single state speaker dependent garbage model 334 is used primarily for word spotting purposes. An empirically determined scoring weight is assigned to this model. Individual scoring weight parameters are also assigned to and associated with each of the three multi-state speaker dependent garbage models 331, 332, 333. To compensate for a garbage model that may be more similar to a word model from which it was created than is desirable, the scoring parameter associated with each speaker dependent word model is adjusted dynamically. The scoring parameter weight adjustment is performed as a function of the number of word models, from the bucket B1, B2, or B3 to which the garbage model corresponds, that were used to create the garbage model. In one embodiment, the weight assigned to a speaker dependent garbage model is lowest when the word model from which it was created is the sole word model included in the corresponding bucket B1, B2, or B3. The scoring weight associated with a speaker dependent garbage model is increased as the number of word models used in the garbage models creation increases up to a preselected number, e.g., four models, at which point the scoring weight is assigned target value.

In accordance with the present invention, a decrease in a scoring weight results in a decreased likelihood that corresponding speaker dependent garbage model will be selected over a competing speaker dependent name model 342. The various scoring weights used for the speaker dependent garbage models may be set externally and adjusted based on empirical results.

In one embodiment, during training, the word spotting garbage scoring weight is set to $-\alpha$ thereby disabling word spotting during training. In addition, during training, the scoring weights assigned to the 3 speaker dependent garbage models 331, 332, 333 are set to values lower than during normal recognition operation since the input during training is normally a known word or phrase to be modeled rendering rejection much less important than during normal recognition operation.

In one embodiment of the present invention, the garbage models are updated for each utterance which is processed in accordance with the present invention, even those that result in the generation of only temporary HMM models used as part of the training process.

What is claimed is:

1. A method of generating a speaker dependent garbage model for use in a speaker dependent speech recognition operation, comprising the steps of:

receiving a first signal including a first utterance from a speaker for which a speaker dependent speech recognition model is to be generated;

generating a speaker dependent speech recognition model from the first utterance, the speaker dependent speech recognition model including a plurality of feature vectors; and processing the feature vectors included in the speaker dependent speech recognition model to generate a plurality of feature vectors representing the speaker dependent garbage model.

2. The method of claim 1, wherein the step of processing the feature vectors included in the speaker dependent speech recognition model includes the steps of:

generating a mean feature vector; and replicating the mean feature vector a preselected number of times to generate the garbage model.

3. A method of generating a speaker dependent garbage model for use in a speaker dependent speech recognition operation, comprising the steps of:

receiving a first signal including a first utterance from a speaker for which a speaker dependent speech recognition model is to be generated;

generating a speaker dependent speech recognition model from the first utterance, the speaker dependent speech recognition model including a plurality of feature vectors; and processing the feature vectors included in the speaker dependent speech recognition model to generate a plurality of feature vectors representing the speaker dependent garbage model, the processing including the steps of:

generating a mean feature vector; and replicating the mean feature vector to generate the garbage model;

receiving another signal including another utterance from said speaker for which a speaker dependent speech recognition model is to be generated;

generating another speaker dependent speech recognition model from the another utterance, the speaker dependent speech recognition model including a plurality of feature vectors; and updating the previously generated speaker dependent garbage model by combining corresponding feature vectors from the garbage model with corresponding feature vectors from the another speaker dependent speech recognition model.

4. The method of claim 3, wherein the combining step performed as part of the updating step includes a feature vector averaging operation.

5. The method of claim 3, further comprising the step of:

repeating the receiving, generating, and updating steps recited in claim 12 thereby updating the speaker dependent garbage model to be a function of a plurality of utterances; and monitoring the number of utterances used in updating the garbage model.

6. The method of claim 5, further comprising the step of:
limiting the number of utterances used to create and update the speaker dependent garbage model.

7. The method of claim 5, further comprising the steps of:
generating a scoring weight to be used in controlling the scoring of the generated speaker dependent garbage model when performing a speech recognition operation; and
adjusting the scoring weight as a function of the number of utterances used to update the generated speaker dependent garbage model.

8. The method of claim 7, further comprising the step of:
generating a single state speaker dependent garbage model as a function of the feature vectors included in the updated garbage model.

9. The method of claim 8, wherein the generated single state garbage model is generated by computing a mean feature vector from a plurality of feature vectors included in the updated garbage speaker dependent model.

10. The method of claim 3, further comprising the step of:
generating a single state speaker dependent garbage model as a function of the feature vectors included in the updated speaker dependent garbage model.

11. The method of claim 3, further comprising the steps of:
generating a scoring weight to be used in controlling the scoring of the generated speaker dependent garbage model when performing a speech recognition operation; and
adjusting the scoring weight as a function of the number of utterances used to update the generated speaker dependent garbage model.

12. A method of generating a speaker dependent garbage model for use in speech recognition applications, comprising the steps of:
receiving a signal including a first utterance representing speech for which a speaker dependent garbage model is to be created;
processing the first utterance to generate a set of speech characteristic data representing the utterance;
performing a distorting operation on the set of speech characteristic data to generate therefrom a speaker dependent garbage model.

13. The method of claim 12,
wherein the set of speech characteristic data includes data corresponding to a plurality of different portions of the utterance; and
wherein the step of performing a distorting operation includes performing a step to reduce the differences between the speech characteristic data corresponding to at least some of the plurality of different portions of the utterance.

14. The method of claim 13,
wherein the speech characteristic data includes feature vectors; and
wherein the step to reduce the differences between speech characteristic data includes a feature vector averaging operation.

15. The method of claim 14,
wherein the step of processing the utterance to generate a set of speech characteristic data representing the utterance includes the step of:
generating a speaker dependent speech recognition model from the utterance including a plurality of feature vectors corresponding to different states included in the model.

16. The method of claim 15, wherein the step of:
performing a distorting operation on the set of speech characteristic data to generate therefrom a speaker dependent garbage model includes the steps of:
generating a mean feature vector from the feature vectors included in the speaker dependent speech recognition model; and
populating the states of a speaker dependent garbage model with generated mean feature vector.

17. The method of claim 16, further comprising the step of:
updating the generated garbage model using feature vectors corresponding to another utterance.

18. The method of claim 17, wherein the updating step includes the step of:
combining garbage model feature vectors with the feature vectors corresponding to the another utterance on a state by state basis.

19. The method of claim 18, further comprising the step of:
monitoring the number of utterances contributing to the creation of the garage model;
associating a scoring weight used to control scoring during a speech recognition operation with the generated garbage model; and
adjusting the scoring weight as a function of the number of utterances contributing to the creation of the garbage model.

20. The method of claim 19,
further comprising the step of monitoring the number of utterances contributing to the creation of the garbage model; and
limiting the number of contributing utterances to a number not exceeding a preselected maximum number.

* * * * *